United States Patent [19]

Re et al.

[11] Patent Number: 4,863,986

[45] Date of Patent: Sep. 5, 1989

[54] FLUORINATED POLYISOCYANATES SUITABLE AS PAINT COMPONENTS

[75] Inventors: Alberto Re; Marco De Giorgi, both of Milan, Italy

[73] Assignee: Montedison S.p.A., Milan, Italy

[21] Appl. No.: 205,152

[22] Filed: Jun. 10, 1988

[30] Foreign Application Priority Data

Jun. 11, 1987 [IT] Italy ................................. 20871 A/87

[51] Int. Cl.$^4$ ............................................. C08G 18/32
[52] U.S. Cl. .................................... 524/197; 525/129;
528/70; 560/25; 560/115; 560/158
[58] Field of Search ........................ 524/197; 525/129;
528/70; 560/25, 115, 158

[56] References Cited

U.S. PATENT DOCUMENTS 4,782,130  11/1988  Re et al. ................................. 528/70

Primary Examiner—Maurice J. Welsh
Attorney, Agent, or Firm—Stevens, Davis, Miller & Mosher

[57] ABSTRACT

Fluorinated polyisocyanates particularly suitable for the formulation of coating paints and compositions in the electronics industry, obtained by starting from a perfluoropolyether polyol having a functionality higher than 2 and from a diisocyanate, the resulting derivative having isocyanic functions being further condensed with a polyol in order to obtain a polyisocyanate with a high degree of functionality, and containing from 1.5% to 9% by weight of —NCO groups.

9 Claims, No Drawings

FLUORINATED POLYISOCYANATES SUITABLE AS PAINT COMPONENTS

DESCRIPTION OF THE INVENTION

This invention relates to a high-functionality fluorinated polyisocyanates and to polymerizable compositions prepared therefrom.

The resins of the present invention are particularly useful as protective coatings for example in the electric, electronics and optic industries, where a protection from chemical and atmospheric agents as well as high electric, optic and surface properties are required.

Polyisocyanate resins and the use thereof as starting products for preparing polyurethane resins for uses such as conformal coatings of printed circuits, electronic components, coils and transformers, are known in the art. Their function is that of coating the apparatus with a protective film capable of preventing or minimizing a deterioration in performance due to pollution, the mail and most common cause thereof being the presence of humidity in the environment.

Further polluting agents capable of damaging printed circuits may come from manufacturing processes, such as for example residual organic solvents, metal particles, inks, powders, or they may come from handling, such as for example fingerprints and fatty cosmetic residues.

In all these cases, the effect of pollution may be removed or remarkably reduced by the application of a protective coating, which furthermore provides a certain protection from impacts and vibrations.

Various conformal coating systems are known in the art, among which the mostly widely utilized are the acrylic coatings, the epoxy coatings, the silicones, the polyimides, and the non-fluorinated polyurethane resins.

Each of the foregoing differs from the others as to application method and specific properties.

In the case of polyurethane coatings, the polyisocyanates of the present invention enables one to obtain, by the same or similar applicative procedures, coatings endowed with improved properties as compared with those obtainable by using the known non-fluorinated polyurethane products, in particular:

- excellent electric properties;
- excellent resistant to humidity;
- extremely low surface energy (high oil and water repellency);
- self-lubricating properties (low coefficient of friction)
- high shelf-life;
- low refractive index.

The polyisocyanates of the present invention are obtained starting from polyols of the perfluoropolyether type, having a hydroxy functionality higher than 2, and preferably higher than 3. These polyols can also be used in admixture with the corresponding perfluoropolyether diols, the mixture having a functionality degree higher than 2, and preferably higher than 3.

The polyols to be used according to the present invention are represented by the following formula:

$$(HO)_a T\text{—}R_f\text{—}T'(OH)_{a'}$$

where a and a' are 1 or 2, the sum a+a' being higher than 2; $R_f$ is a difunctional radical having a perfluoropolyether structure, an average molecular weight preferably ranging from 400 to 7000, and consisting of sequences of oxyperfluoroalkylene units, such as for example the units:

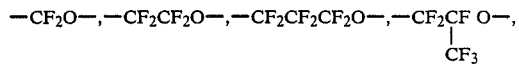

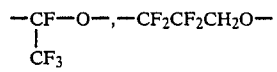

T and T', equal to or different from each other, represent a linking group between the perfluoropolyether chain and the —OH groups and may be a divalent radical of the type: —$(CH_2)_x$— where x=1-4, or —$CH_2O(CH_2CH_2O)_yCH_2CH_2$—, where y=0-4. At least one of the groups T, T' is a trivalent radical characterized in that it contains at least an ether or amidic bond, such as for example

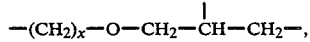

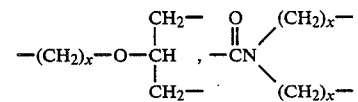

or a plurality of alkyleneoxy groups such as for example:

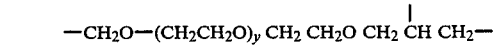

or

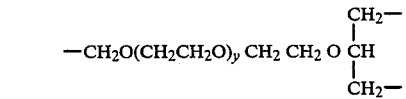

In the above formulas, x and y are the same as defined hereinbefore.

The perfluoropolyether polyols mentioned above are obtainable by introducing —OH groups at the end of perfluoropolyether chains according to broadly known methods, such as for example:

reduction of an ester end group —COOR, whereby a —$CH_2OH$ group is obtained;

reaction of an end group —$CH_2OH$ with epichlorohydrin to obtain a dihydroxy end group

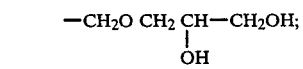

reaction of anacid end group —COOH (or —COF) with diethanolamine to obtain the end group:

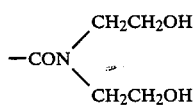

reaction of an end group —$CH_2OH$ with a diglycidyl ether to obtain a dihydroxy end group.

Some of the above reactions are described in particular in U.S. Pat. No. 3,810,874.

Starting perfluoropolyethers which are useful to obtain the perfluoropolyether polyols cited above are in particular those having the following structure: A(CF$_2$CF$_2$O)$_n$(CF$_2$O)$_m$A', where A and A' are end groups of the acid type —CF$_2$COF, —COF, —COOH, —CF$_2$COOH, or of the ester type —CF$_2$COOR, —COOR (R=alkyl) suitable for being converted into hydroxylated groups, as mentioned above; the m/n ratio ranges from 0.2 to 2, and preferably from 0.1 to 1.2, the sum m+n being such as to be in the molecular weight ranges specified above. Products of this type are described in U.S. Pat. No. 3,847,978.

Other perfluoropolyethers which are suitable for obtaining said perfluoropolyether polyols are those consisting of sequences of perfluorooxyalkylene units of the following classes:

where X=F or CF$_3$, said units being statistically distributed along the perfluoropolyether chain;

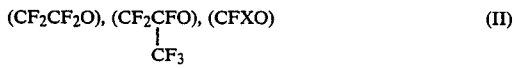

where X=F or CF$_3$, said units being statistically distributed along the perfluoropolyethereal chain;

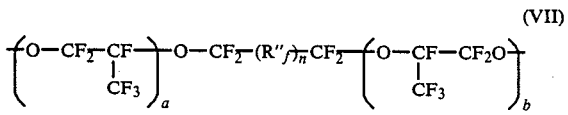

where R'$_f$ is a fluoroalkylene group, n is 0 or 1, p and q are integers from 1 to 10 and p+q is at least 2;

where R''$_f$ is a fluoroalkylene group, n is 0 or 1, a and b are integers and a+b is at least 1;

(CF$_2$CF$_2$O). (VIII)

The starting perfluoropolyethers of classes II, V, VIII may be functionalized, if necessary or desired, at both ends by means, for example, of the separation process described in Italian patent application No. 22920 A/85, which gives rise to acid end groups —COF, which are readily convertible to hydroxyl end groups.

The fluorinated polyisocyanates of the present invention are those obtained starting from the above-defined perfluoropolyether polyols, by reaction with OCN—R$_2$—NCO diisocyanates, thereby obtaining substitution of the —OH groups by isocyanate groups having the structure —OCONHR$_2$—NCO. Thus, a first type of polyisocyanate of the formula:

is obtained, wherein Z is an isocyanate group having the above structure —OCONHR$_2$—NCO, R$_2$ being an alkylene, cycloalkylene, alkyl-cycloalkylene, arylene, alkylarylene divalent radical containing from 2 to 20 carbon atoms. The significances of R$_f$, T, T', a, a' are the same as defined above.

The polyisocyanates of formula (I) are convertible to polyisocyanates having a higher degree of —NCO functionality by reacting them with a polyol of formula: R$_1$(OH)$_t$(III), where t=2 to 4 and R$_1$ is a divalent, trivalent or tetravalent radical of the alkylene, cycloalkylene, fluoroalkylene types, or a polyoxyalkylene radical having a molecular weight from 200 to 4000, or a polyester radical having a molecular weight from 200 to 4000.

Other types of radicals R$_1$ are those of the formula R—N(C$_n$H$_{2n}$)$_2$— (IV), where R=alkyl (in the diol) or —C$_n$H$_{2n}$— (in the triol), or of the formula:

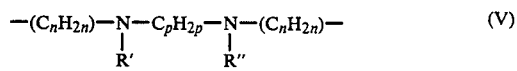

wherein R' and R'', equal to or different from each other, are an alkyl or —C$_n$H$_{2n}$— group, and p and n, which are equal to or different from each other, are integers from 1 to 10.

From the reaction of the polyol of the formula (III) with the polyisocyanate of the formula (I) it is possible to obtain, as explailned above, a polyisocyanate having a higher functionality degree, represented by the formula:

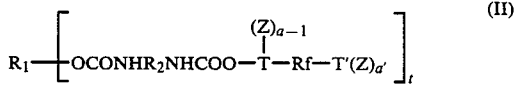

where t=2 to 4

For the preparation of the polyisocyanates corresponding to the formulas I and II it is possible advantageously to utilize diisocyanates of both the aromatic type such as e.g., 2,4- and 2,6-toluenediisocyanate, xylylenediisocyanate, 4,4'-diphenylmethane diisocyanate, and of the aliphatic type, among which are hexamethylene diisocyanate, isophoronediisocyanate, 4,4'-dicyclohexylmethanediisocyanate, cyclohexyl-1,4-diisocyanate.

Preferred are the aliphatic diisocyanates and, among them, isophoronediisocyanate (IPDI) and 4,4'-cicyclohexylmethanediisocyanate (H$_{12}$MDT).

Any polyol corresponding to the formula (III) is utilizable for preparing the polyisocyanate of the invention.

Some examples of utilizable polyols are: ethylene glycol, 1,3-propylene glycol, 1,4-butylene glycol, trimethylolpropane, trimethylolethane, glycerine, 1,2,6-hexanetriol, pentaerythritol, polyethylene glycol, polypropylene glycol, polybutylene glycol or polyester polyols known in the art.

The preferred fluorinated polyisocyanates, according to the formulas I and II, and mixtures thereof, are those having a free NCO content, calculated on a dry basis, ranging from 1.5 to 9% by weight, preferably from 3 to 7%. Those obtained from fluorinated perfluoropolyether polyol with a functionality equal to 4, with end groups T, T' of the type:

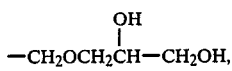

$R_1$ = difunctional or trifunctional radical and
$R_2$ = aliphatic radical may also be employed.

According to a preferred method, the polyfunctional polyether polyol and the diisocyanate are changed, in the first step, into a reactor and are reacted at a temperature ranging from 40° to 100° C.

On conclusion of the reaction, to the resulting product corresponding to formula I, which is already utilizable as such, polyol $R_1(OHY)_t$ of formula III or a mixture of polyols is added, which results in an increase in the polyisocyanate functionality.

In this second step, the reaction temperature ranges from 20° to 100° C.

The reaction is conducted in the presence of suitable solvents which are free from active hydrogen, such as for example: dilmethylformamide, butyl acetate, ethylene glycol diacetate, cellosolve acetate, polyoxyethylene monoethylether acetate, etc.

With a view to increasing the reaction rate it is advisable to operate in the presence of small amounts ($\leq 0.1\%$ by weight) of suitable catalysts, among which are tertiary amines such as diazodicyclooctane and dimethylcyclohexylamine and metallorganic derivatives such as dibutyltin diacetate, dibutyltin dilaurate, and tin octate, and propyleneglycol monomethylether acetate, and mixtures thereof.

The preparation of the polyisocyanates, according to the invention, of formulae I and II, or of mixtures thereof, may be usefully conducted in one step or in two steps according to the following scheme, referred to starting product tetraol:

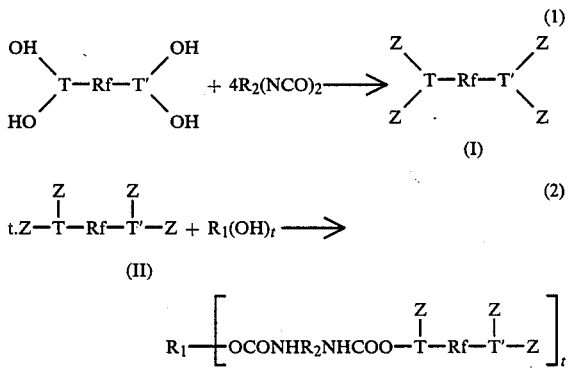

By using, in the second passage, an excess of polyisocyanate with respect to what is indicated in the above scheme, a mixture of compounds I and II is obtained, the functionality of which is intermediate between those of the two compounds I and II.

By using, in the second passage, an excess of polyol with respect to what is indicated in the above scheme, insoluble cross-linked products would form.

The polyisocyanates prepared according to the above method may be utilized either directly as they are obtained form the reaction, or after dilution wit compatible solvents such as xylols, toluene, or acetates of formula $CH_3COOR_3$, where $R_3$ is a straight or branched alkyl radical containing from 2 to 6 carbon atoms, or ketones of formula $R_4CO-R_5$, where $R_4$ and $R_5$ are straight or branched alkyl radicals containing from 1 to 5 carbon atoms, or chlorofluorohydrocarbons such as Delifrene 113, etc.

As protective coatings, the polyisocyanates of this invention may be utilized in single-component formulations, which are cross-linked by reaction with the environmental humidity, or in two-component formulations, in which a polyfunctional compound with active hydrogens acts as a cross-linking agent.

Particularly suited to the purpose due to their compatibility with the system are the polyols corresponding to the above formulas IV and V.

Examples of such polyols are:
tris[(2-hydroxyethyl)amino]$(HOCH_2CH_2)_3N$ THEA
N,N,N',N'-tetrakis(2-hydroxyethyl)ethylenediamine
$(HOCH_2CH_2)_2NCH_2CH_2N(CH_2CH_2OH)_z$
THEED
[N,N,N',N'-tetrakis(2-hydroxypropyl)ethylenediamine

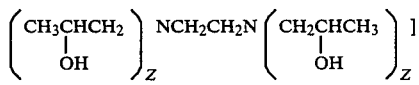

N,N-bis(2-hydroxyethyl)methylamine
$CH_3N(CH_2CH_2OH)_2$.

The formulations for paints based on the polyisocyanates according to the present invention may be additioned with the usual pigments and fillers. Furthermore, as they have a sufficient fluorine content they are compatible with fillers such as fluorinated polymers, in particular polytetrafluoroethylene.

The coating films obtained after drying of the paints according to the invention are characterized by the following properties:
contact angle: from 100° to 110°, measured according to method ATICELCA MC 21-72;
coefficient of friction: from 0.1 to 0.3, measured according to standard ASTM D 1894-78;
Sward hardness: from 40 to 70, measured according to standard ASTM D 2134-66;
resistance to humidostat and to salt spray fog: higher than 1,000 hours, measured according to standard ASTM D 117-73;
low refractive index, measured according to standard ASTM D 542;
excellent electric properties
high flexibility even at very low temperature (lower than $-80°$ C.).

As already mentioned, the products according to this invention are well suited for uxse as conformal coatings in the electronics industry. Suitable for this use also are the fluorinated polyisocyanates prepared, according to Italian application No. 23184 A/85, starting from perfluoropolyether diols by subsequent reaction with diisocyanates and polyols.

For a still better understanding of the invention and the reduction to practice of same, some illustrative but not limitative examples are given hereinafter.

EXAMPLE 1

Into a 500 cc reactor equipped with stirrer, thermometer, and reflux cooler there were charged, in a nitrogen atmosphere, 150 g of the tetrafunctional derivative Fomblin Z having a perfluoropolyether chain of the type:

A'—(CF$_2$CF$_2$O)$_n$(CF$_2$O)$_m$—A wherein terminal groups A and A' are equal to

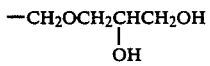

and having u/m=0.8 and equivalent weight OH=514.

Then 69.19 g (0.306 moles) of isophorone-diisocyanate, 0.3 ml of a 0.2N solution of dibutyltin diacetate in cellosolve acetate, and 200 g of cellosolve acetate were added.

The mixture was heated to 70° C. and this temperature was maintained during 4 hours, after which the whole was cooled, thereby obtaining a limpid solution of a fluorinated polyisocyanate having an NCO content of 2.8% by weight (5.75% on dry basis), the structure of which is represented by the formula:

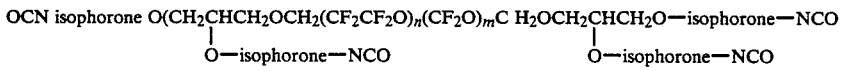

EXAMPLE 2

Into a 1 liter equipped with stirrer, thermometer, and reflux cooler there were charged, in a nitrogen atmosphere, 150 g of tetrafunctional derivative Fomblin having an equivalent weight OH=472, 74.18 g (0.334 moles) of isophorone diisocyanate, 200 g of cellosolve acetate, and 0.33 ml of a 0.2N solution of dibutyltin diacetate in cellosolve acetate.

The whole was heated to 70° C. and maintained at this temperature for 2 hours, after which 3.58 g (0.04 moles) of 1,4-butane diol dissolved in 27.76 g of cellosolve acetate were added.

After a further 3-hour heating, the whole was cooled down to room temperature, thus obtaining a limpid and colorless fluorinated polyisocyanate solution, the structure of which is represented by formula:

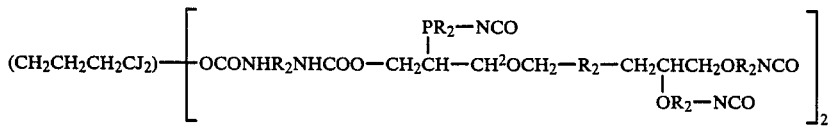

wherein R$_2$ is a divalent isophorone radical, and having an NCO content equal to 2.3% by weight (theoretical: 2.44%)

EXAMPLE 3

Into a 1-liter reactor equipped with stirrer, thermometer and reflux cooler there were charged, in a nitrogen atmosphere, 150 g of tetrafunctional derivative Fomblin Z having equivalent weight OH=514, 68.11 (0.306 moles) of isophorone diisocyanate, 200 ml of cellosolve acetate, 0.30 ml of a 0.2N solution of dibutyltin diacetate in cellosolve acetate.

The mixture was heated to 70° C. and this temperature was maintained for 2 hours, after which 3.27 g of trimethylol propane dissolved in 21.4 g of cellosolve acetate were added.

After a further 3-hour heating it was cooled down to room temperature, so obtaining a fluorinated polyisocyanate solution of formula (II) with t=3 and

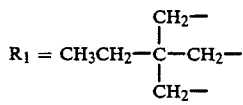

and having an NCO content=2.4% (theoretical: 2.35%).

EXAMPLE 4

A portion of each of the solutions prepared as described in Examples 1–3 was applied onto glass plates. After a 7-day drying in air at room temperature, colorless and transparent films having a thickness ranging from 35 to 40 microns were obtained.

The characteristics of the films obtained are reported on Table 1.

EXAMPLE 5

0.38 g of N,N,N',N'-tetrakis(2-hydroxypropyl)ethylenediamine dissolved in 1 g of cellosolve acetate were added to 10 g of the solution obtained as described in Example 2.

The resulting solution was spread on a glass plate, which was placed into an oven at 60° C. and left there for 3 hours.

A 40 micron thick film, the characteristics of which are reported on Table 1, was obtained.

EXAMPLE 6

A portion of the solution described in Example 2 was poured into Teflon pans having round cross-sections of 10 cm diameter. After a 7-day drying in air, test-pieces were obtained which were utilized to determine a few electric properties.

Another portion of the same solution was utilized to obtain a coating on a copper plate board from the measurement of surface resistivity.

The electrical characteristics are reported on Table 2.

TABLE 1

| Characteristic | Measure Unit | Example 4 Used Solutions | | | Measurement Method | Ex. 5 Value |
| --- | --- | --- | --- | --- | --- | --- |
| | | 1 | 2 | 3 | | |
| Contact angle | degrees | 106 | 107 | 107 | ATICELCA | 105 |

TABLE 1-continued

| Characteristic | Measure Unit | Example 4 Used Solutions 1 | 2 | 3 | Measurement Method | Ex. 5 Value |
|---|---|---|---|---|---|---|
| with H$_2$O | | | | | MC 21-72 | |
| Coefficient of friction | — | 0.16 | 0.15 | 0.20 | ASTM D1894-78 | 0.2 |
| Sward hardness | — | 65 | 48 | 50 | ASTM D2134-66 | 50 |
| Refractive index | — | 1,405 | 1,410 | 1,412 | ASTM D542-77 | 1.422 |
| Humidostat resistance | — | >1000 | >1000 | >1000 | ASTM D2247-68 | >1000 |
| Salt spray fog resistance (B-117) | hours | >1000 | >1000 | >1000 | ASTM D117-73 | >1000 |

TABLE 2

| Characteristic | Measure Unit | Value | Method |
|---|---|---|---|
| Dielectric Rigidity | KV/mm | 26.0 | ASTM D149 |
| Dielectric Constant | — | 2.7 | ASTM D150/50 HZ |
| Dissipation Factor | — | $5 \times 10^{-3}$ | ASTM D150/50 HZ |
| Volume Resistivity | Ω.cm | $4.9 \times 10^{15}$ | ASTM D257 |
| Surface Resistivity | Ω | $3.5 \times 10^{14}$ | ASTM D257 |
| After 24 h in H$_2$O at 25° | Ω | $3.8 \times 10^{14}$ | ASTM D257 |
| After 24 h at 60° C. and 95% rel. humidity | Ω | $3.5 10^{14}$ | ASTM D257 |

What is claimed is:

1. High-functionality fluorinated polyisocyanates of formula:

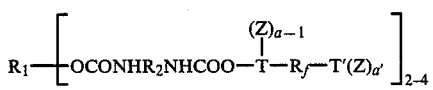

where:
R$_1$ is a divalent, trivalent or tetravalent radical of the alkylene, cycloalkylene, fluoroalkylene or polyoxyalkylene type having a moleculr weight from 200 to 4000, or a radical having a polyester structure and a molecular weight from 200 to 4000;
R$_2$ is an alkylene, cycloalkylene, alkylcycloalkylene, arylene, alkyl-arylene divalent radical containing from 2 to 20 carbon atoms;
R$_f$ is a divalent radical having a perfluoropolyether structure and an average molecular weight from 400 to 7000,
consisting of a sequence of oxyperfluoroalkylene units selected from: —CF$_2$O—, —CF$_2$CF$_2$O—, —CF$_2$CF$_2$CF$_2$O—,

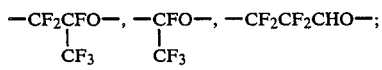

T and T', like or unlike each other, represent a linking group between the perfluoropolyether chain and the monovalent Z groups and may be a divalent radical of the alkylene or the oxyalkylene type and at least one of them is a trivalent radical;
Z is a monovalent radical containing an isocyanate group having the structure —OCONHR$_2$; and
a and a' are 1 or 2 each, their sum being higher than 2, and furthermore characterized in that they contain from 1.5% to 9% by weight of —NCO groups.

2. The fluorinated polyisocyanates of claim 1, wherein T, T' are selected from:
 (a) straight alkylene divalent radicals having 1 to 4 C;
 (b) oxyalkylene divalent radicals of the type: —CH$_2$O(CH$_2$CH$_2$O)$_y$CH$_2$CH$_2$— where y=0 to 4; and
 (c) trivalent radicals containing at least an ether or amidic bond.

3. The fluorinated polyisocyanates of claim 1, wherein R$_2$ is a divalent radical derived from isophoronediisocyanate.

4. The fluorinated polyisocyanates of claim 1, wherein R$_1$ is the radical —CH$_2$CH$_2$CH$_2$CH$_2$—.

5. The fluorinated polyisocyanates of claim 1, wherein R$_1$ is the trivalent radical:

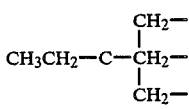

6. A process for preparing the polyisocyanates of claim 1, which comprises reacting, at a temperature from 40° to 100° C., a perfluoropolyether polyol of the formula: (HO)$_a$T—R$_f$—T'(OH)a' with a diisocyanate CON—R$_2$—NCO, thereby obtaining polyisocyanate (Z)$_a$T—R$_f$—T'(Z)$_{a'}$ wherein Z=—OCONHR$_2$, the polyisocyanate so obtained being then condensed by reaction at a temperature ranging from 20° to 100° C. with a polyol R$_1$(OH)$_t$, where t=2 to 4.

7. Paints containing, as a film-forming substance, the polyisocyanate of claim 1.

8. The paints of claim 7, containing as a solid filler, polyetetrafluoroethylene.

9. The method of obtaining protective coating layers (conformal coatings) on articles manufactured by the electronics industry comprising applying as a film-forming substance on said articles a polyisocyanate as defined in claim 1.

* * * * *